(12) United States Patent
Nakano et al.

(10) Patent No.: US 7,326,467 B2
(45) Date of Patent: Feb. 5, 2008

(54) POLYCARBONATE-BASED RESIN COMPOSITION FOR EXTRUSION MOLDING USING SIZING DIE AND MOLDED PRODUCT

(75) Inventors: Hiroshi Nakano, Hiratsuka (JP); Hidetaka Ito, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 151 days.

(21) Appl. No.: 10/527,352

(22) PCT Filed: Sep. 26, 2003

(86) PCT No.: PCT/JP03/12314

§ 371 (c)(1),
(2), (4) Date: Nov. 29, 2005

(87) PCT Pub. No.: WO2004/031297

PCT Pub. Date: Apr. 15, 2004

(65) Prior Publication Data

US 2006/0127675 A1     Jun. 15, 2006

(30) Foreign Application Priority Data

Sep. 30, 2002  (JP) .............. 2002-285851
Oct.  9, 2002  (JP) .............. 2002-295874

(51) Int. Cl.
*B32B 27/36* (2006.01)
(52) U.S. Cl. ............ 428/412; 264/176.1; 264/219; 428/411.1; 528/196; 528/198
(58) Field of Classification Search ............ 264/176.1, 264/219; 428/411.1, 412; 528/196, 198
See application file for complete search history.

(56) References Cited

U.S. PATENT DOCUMENTS 4,541,884 A * 9/1985 Cogswell et al. ........... 156/166
2003/0175488 A1 * 9/2003 Asthana et al. ............. 428/212

* cited by examiner

*Primary Examiner*—Terressa Boykin
(74) *Attorney, Agent, or Firm*—Edwards, Angell, Palmer & Dodge, LLP; David G. Conlin; Lisa Swiszcz Hazzard

(57) ABSTRACT

A polycarbonate-based resin composition for extrusion molding using a siring die, and a molded product produced by extrusion-molding the resin composition using a sizing die, The polycarbonate-based resin composition comprises, as a main component, a polycarbonate having a viscosity-average molecular weight of 17000 to 27000 and containing main repeating units represented by the following formula (A):

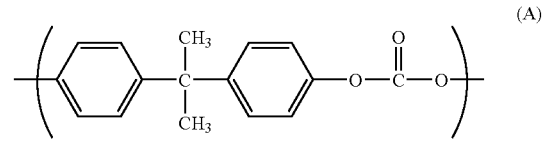

wherein an amount of proton (Pa) and an amount of proton (Pb) per 1 g of the polycarbonate which are calculated from respective integral values of a signal (a) detected at $\delta=7.96$ to 8.02 ppm and a signal (b) detected at $\delta=8.11$ to 8.17 ppm in $^1$H-NMR spectra thereof as measured in a deuterated chloroform solvent, satisfy the following formula (1):

$$4 < \{(Pa)+(Pb)\} < 26 \qquad (1)$$

wherein a unit of each of (Pa) and (Pb) is µmol/g. The above polycarbonate resin composition exhibits good mechanical properties and a good moldability.

28 Claims, No Drawings

POLYCARBONATE-BASED RESIN COMPOSITION FOR EXTRUSION MOLDING USING SIZING DIE AND MOLDED PRODUCT

CROSS-REFERENCE TO RELATED APPLICATION(S)

This application is a §371 application of copending international patent application PCT/JP03/12314 which was filed on Sep. 26, 2003, which is incorporated by reference.

TECHNICAL FIELD

The present invention relates to polycarbonate-based resin compositions for extrusion molding using a sizing die, and molded products obtained by extrusion-molding the resin composition using a sizing die, and more particularly, to polycarbonate-based resin compositions for extrusion molding using a sizing die which have specific integral values of signals in $^1$H-NMR spectra thereof, apply a less load to a molding machine, and are excellent in hue and impact resistance, as well as molded products obtained therefrom.

BACKGROUND ARTS

Polycarbonates have been used in various applications because of excellent heat resistance, mechanical properties, dimensional stability and transparency thereof. Ordinary conventional polycarbonates have a linear molecular structure. The polycarbonates having such a molecular structure tend to show a large drawdown, etc., namely be deficient in melt tension upon extrusion molding, especially when extrusion-molded using a sizing die having a function of cooling a molten resin extruded from an extruder while forming the molten resin into a desired shape. When a molecular weight of the polycarbonates is increased to improve melt properties thereof such as drawdown, a melt viscosity of the polycarbonates becomes too high upon extrusion molding, so that a load applied to the extruder is too large, resulting in defects such as poor productivity. Therefore, there has been a demand for improving these properties of the polycarbonates.

As the method of improving the melt properties of the polycarbonates such as drawdown, there is known the method of branching polycarbonates by interfacial polymerization method using 2,2-bis(4-hydroxydiphenyl)propane (hereinafter referred to merely as "bisphenol A" or "BPA") together with a polyfunctional compound as a branching agent such as 1,1,1-tris(4-hydroxyphenyl)ethane (THPE) and 1,3,5-tris(4-hydroxyphenyl)benzene (e.g., Japanese Patent Publication (KOKOKU) Nos. 44-17149 and 47-2918, Japanese Patent Application Laid-Open (KOKAI) Nos. 2-55725 and 4-89824, etc.). However, in order to obtain branched polycarbonates having melt properties sufficient to stably produce profile extrusion-molded products having a complicated shape using a die (for example, twin-wall molded products), it is required to copolymerize a large amount of the polyfunctional compound with the polycarbonates, resulting in problems such as discoloration of the resultant molded products, contamination of production lines and increased costs owing to the polyfunctional compound used in a large amount.

To solve these problems, various attempts have been conducted in transesterification methods using a carbonic diester and an aromatic dihydroxy compound (for example, Japanese Patent Application Laid-Open (KOKAI) Nos. 4-89824 and 6-136112, Japanese Patent Publication (KOKOKU) Nos. 7-37517 and 7-116285, etc.). However, these methods tend to be still unsatisfactory due to decomposition of the branching agent at a high temperature which results in failure to exhibit a sufficient branching effect, as well as occurrence of discoloration upon melt molding.

DISCLOSURE OF THE INVENTION

An object of the present invention is to provide a polycarbonate-based resin composition which exhibits good mechanical properties inherent to polycarbonates, a good transparency, a good moldability and an excellent hue, and is suitable for producing profile extrusion-molded products such as pipes and twin-wall products using a sizing die, as well as a molded product obtained by extrusion-molding the polycarbonate-based resin composition using a sizing die.

As a result of the present inventors' earnest study to solve the above problems, it has been found that a polycarbonate-based resin composition for extrusion molding using a sizing die, comprising as a main component, a polycarbonate having a viscosity-average molecular weight of 17000 to 27000 and containing main repeating units represented by the following formula (A):

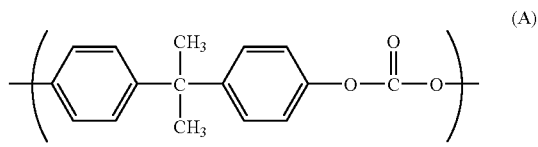

wherein an amount of proton (Pa) and an amount of proton (Pb) per 1 g of the polycarbonate which are calculated from respective integral values of a signal (a) detected at $\delta$=7.96 to 8.02 ppm and a signal (b) detected at $\delta$=8.11 to 8.17 ppm in $^1$H-NMR spectra thereof as measured in a deuterated chloroform solvent, satisfy the following formula (1):

$$4<\{(Pa)+(Pb)\}<26 \qquad (1)$$

wherein a unit of each of (Pa) and (Pb) is µmol/g, is suitable for extrusion molding using a sizing die, and exhibits a good moldability upon extrusion-molding using a sizing die, and a molded product produced from the resin composition is excellent in impact resistance, mechanical properties, heat resistance and hue.

The present invention has been attained on the basis of the above findings.

In the preferred embodiment of the present invention, there are provided the above polycarbonate-based resin composition in which a ratio of an amount of proton (Pc) per 1 g of the polycarbonate which is calculated from an integral value of a signal (c) detected at $\delta$=10.35 to 10.50 ppm in $^1$H-NMR spectra thereof as measured in a deuterated chloroform solvent, to the amount of proton (Pa) ((Pc)/(Pa)), and a ratio of the amount of proton (Pa) to the amount of proton (Pb) ((Pa)/(Pb)) satisfy the following formulae (2) and (3), respectively; and further the above polycarbonate-based resin composition in which the amount of proton (Pb) and the amount of proton (Pc) have a relationship represented by the following formulae (4):

$$0 \leq (Pc)/(Pa)<0.5 \qquad (2);$$

$$0.5<(Pa)/(Pb)<3 \qquad (3); \text{ and}$$

$$0.70<(Pb)/\{(Pb)+(Pc)\}<0.96 \qquad (4)$$

wherein a unit of each of (Pa), (Pb) and (Pc) is µmol/g.

In addition, the polycarbonate is preferably produced by transesterification reaction method, namely by transesterifying an aromatic dihydroxy compound with a carbonic diester in the presence of a polymerization catalyst, and the resin composition preferably further contains a mold release agent.

Further, in the other preferred embodiments of the present invention, there are provided a molded product produced by extrusion-molding the above polycarbonate resin composition using a sizing die; the molded product which is in the form of a twin-wall molded product or a molded product having three or more-layered walls; and a molded product which is provided on at least a part of a surface thereof with a coating layer, or a molded product which is integrally laminated with the other resin composition by a co-extrusion method.

The present invention is described in detail below.

The polycarbonate used in the present invention preferably fulfills such a requirement that an amount of proton (Pa) and an amount of proton (Pb) per 1 g of the polycarbonate which are calculated from respective integral values of a signal (a) detected at $\delta=7.96$ to $8.02$ ppm and a signal (b) detected at $\delta=8.11$ to $8.17$ ppm in $^1$H-NMR spectra thereof as measured in a deuterated chloroform solvent, lie within the range represented by the following formula (1):

$$4<\{(Pa)+(Pb)\}<26 \tag{1},$$

preferably within the range represented by the following formula (5):

$$6<\{(Pa)+(Pb)\}<26 \tag{5},$$

wherein a unit of each of (Pa) and (Pb) is μmol/g; and and more preferably within the range represented by the following formula (6):

$$7<\{(Pa)+(Pb)\}<22 \tag{6},$$

wherein a unit of each of (Pa) and (Pb) is μmol/g.

In addition, the above polycarbonate has a viscosity-average molecular weight of 17000 to 27000, preferably 19000 to 26000 and more preferably 20000 to 24000. When the sum of Pa and Pb ((Pa)+(Pb)) is not more than 4, the resultant composition tends to show a large drawdown upon profile extrusion molding thereof, resulting in deteriorated moldability. When the sum of Pa and Pb ((Pa)+(Pb)) is not less than 26, the resultant composition tends to deteriorated in hue and impact strength. When the viscosity-average molecular weight of the polycarbonate is less than 17000, the resultant composition tends to suffer from formation of gel and deteriorated impact strength. When the viscosity-average molecular weight of the polycarbonate exceeds 27000, the resultant composition tends to show a too high melt viscosity, resulting in a undesirably high load applied to an extruder used.

Further, the polycarbonate used in the present invention more preferably fulfills such a requirement that a ratio of an amount of proton (Pc) per 1 g of the polycarbonate which is calculated from an integral value of a signal (c) detected at $\delta=10.35$ to $10.50$ ppm in $^1$H-NMR spectra thereof as measured in a deuterated chloroform solvent, to the amount of proton (Pa) ((Pc)/(Pa)), and a ratio of the amount of proton (Pa) to the amount of proton (Pb) ((Pa)/(Pb)), satisfy the following formulae (2) and (3), respectively:

$$0 \leq (Pc)/(Pa)<0.5 \tag{2); and}$$

$$0.5<(Pa)/(Pb)<3 \tag{3}$$

wherein a unit of each of (Pa), (Pb) and (Pc) is μmol/g.

When the ratio (Pc)/(Pa) is not less than 0.5, the resultant composition tends to show a large drawdown, resulting in deteriorated profile extrusion moldability. When the ratio (Pa)/(Pb) is not less than 3, the resultant composition tends to be deteriorated in resin hue. When the ratio (Pa)/(Pb) is not more than 0.5, the resultant composition tends to be deteriorated in profile extrusion moldability.

In addition, the above (Pb) and (Pc) more preferably satisfy a relationship represented by the following formula (4):

$$0.70<(Pb)/\{(Pb)+(Pc)\}<0.96 \tag{4}.$$

When the value of $(Pb)/\{(Pb)+(Pc)\}$ exceeds the upper limit of the formula (4), the resultant composition tends to be deteriorated in hue. When the value of $(Pb)/\{(Pb)+(Pc)\}$ is less than the lower limit of the formula (4), the resultant composition tends to show a large drawdown upon blow-molding.

It has been reported in "Polymer", 42(2001), 7653 that the above signals (b) and (c) detected from the polycarbonate used in the present invention are attributed to a branched skeleton in a phenyl salicylate structure and an unbranched skeleton in the phenyl salicylate structure, respectively. If the improvement in extrusion moldability depends upon only the branched skeleton of the phenyl salicylate structure to which the signal (b) is attributed, it is considered that a higher intensity of the signal (b) in the polycarbonate leads to better improvement in extrusion moldability thereof. However, as a result of the present inventors' studies, it becomes apparent that only the increased intensity of the signal (b) fails to well control the extrusion moldability of the polycarbonate.

As described in "Polymer", 42(2001), 7653, it is known that polycarbonates produced by transesterification reaction method contain branched structures other than the branched structure to which the signal (b) is attributed. There are not clearly known the positions in $^1$H-NMR spectra where the branched structures other than the branched structure to which the signal (b) is attributed show signals, as well as the number of kinds of branched structures other than the branched structure to which the signal (b) is attributed. However, according to the present inventors' studies, it becomes apparent that the intensity of the above signal (a) and the profile extrusion moldability of the polycarbonates have a specific interrelation to each other. Further, there is not clearly known the chemical structure from which the signal (a) is derived, and there is such a possibility that the signal (a) is not attributed to a single kind of chemical structure but appears as a sum of signals attributed to a plurality of similar chemical structures which are observed in a specific range. Nevertheless, in accordance with the present invention, it has been found that a sum of integral values of the signals (a) and (b) $\{(Pa)+(Pb)\}$ which lies in a specific range, is an important factor for determining the profile extrusion moldability of the polycarbonates. Accordingly, when the sum $\{(Pa)+(Pb)\}$ is not more than 4, the resultant composition tends to show a large drawdown upon profile extrusion molding thereof, resulting in poor moldability. On the other hand, when the sum $\{(Pa)+(Pb)\}$ is not less than 26, the resultant composition tends to suffer from a too large swelling, resulting in poor extrusion moldability and deteriorated impact strength.

In "Polymer", 42(2001), 7653, it is also described that the structures from which the signal (a) is derived contain not only unbranched phenyl salicylate structures but also unknown structures. In the present invention, it is preferred that the amount of signal components derived from the unbranched phenyl salicylate structures contained in the signal (a) is smaller. Although the amount of the signal components derived from the unbranched phenyl salicylate structures contained in the signal (a) may be obtained by dividing the integral value of the signal (a) into segments, it may be difficult in many cases to accurately divide or separate the integral value of the signal (a). For this reason, it is preferred that the amount of the signal components derived from the unbranched phenyl salicylate structures contained in the signal (a) is obtained using the signal (c), more specifically, calculated as the ratio of (Pc) to (Pa) ((Pc)/(Pa)). In the present invention, the ratio (Pc)/(Pa) is preferably in the range of from 0 to less than 0.5. When the ratio (Pc)/(Pa) is not less than 0.5, the resultant composition tends to show a large drawdown upon profile extrusion molding thereof, resulting in poor moldability.

Although there is not clearly known the degree of influence of the above signals (a) and (b) on profile extrusion moldability of the polycarbonate, it is expected that the signal (a) more effectively contributes to improvement in the profile extrusion moldability. On the other hand, it is considered that the signal (b) largely contributes to the effect of preventing discoloration of the polycarbonate. Therefore, the well-balanced relation between the amount of proton (Pa) which has a some influence on discoloration of the polycarbonate but is useful for reducing drawdown thereof and the amount of proton (Pb) which is not sufficiently useful for reducing the drawdown but effective for preventing discoloration of the polycarbonate is important for maintaining various good properties of the polycarbonate in a well-balanced manner. From such viewpoints, it is preferred that both the signals (a) and (b) are present together. The ratio (Pa)/(Pb) is preferably in the range of from more than 0.5 to less than 3. When the ratio (Pa)/(Pb) is not more than 0.5, even though the sum {(Pa)+(Pb)} satisfies the above formula (1), the effect of improving the profile extrusion moldability tends to be insufficient. When the ratio (Pa)/(Pb) is not less than 3, the polycarbonate tends to suffer from considerable discoloration. According to the descriptions in "Polymer", 42(2001), 7653, the signals (b) and (c) are derived from the branched skeleton of the phenyl salicylate structure and unbranched skeleton of the phenyl salicylate structure, respectively. Therefore, when the unbranched structure is excessively reduced (i.e., the intensity of the signal (c) is excessively lowered) in order to increase the branched structure (i.e., enhance the intensity of the signal (b)), there is caused such a tendency that the polycarbonate is undesirably discolored. Thus, in the preferred embodiment of the polycarbonate according to the present invention, the signal (a), (b) and (c) are respectively present in well-balanced ranges satisfying the above formulae (1), (2), (3) and (4).

The measurement of $^1$H-NMR spectra applied to the polycarbonate of the present invention must be conducted, in particular, with a high sensitivity, since intensities of the respective signals to be detected in the present invention are very low. For example, when signals of a polycarbonate solution having a concentration of 10 to 20% by weight are integrated at a cumulative frequency of 6000 times or more using an NMR spectroscope operated at about 400 MHz or more, it is possible to obtain a signal/noise ratio (S/N ratio) sufficient to achieve quantitative determination thereof. In addition, as to the quantitative determination method, even when using methyl group, etc., in repeating constituting units of the polycarbonate which are generally used as a standard signal therefore, quantitative determination of the polycarbonate is not satisfactorily performed. Therefore, it is required to add the other standard substance showing signals in such a range where no signals derived from the polycarbonate are present, such as tetraphenyl methane (TPM).

Meanwhile, in the case where no signal (c) is detected notwithstanding the presence of the unbranched phenyl salicylate structure as described in "Polymer", 42(2001), 7653, it is considered that resolution or definition used in the measurement is insufficient. In such a case, it is required to further increase the cumulative frequency. Also, it is possible to obtain the amount of proton (Pc) from the integral value of signal detected near the range of δ=8.00 to 8.02 ppm as described in "Polymer", 42(2001), 7653. However, in this case, the measurement error tends to become large.

The polycarbonate used in the present invention is preferably produced by subjecting an aromatic dihydroxy compound and a carbonic diester as raw materials to transesterification reaction.

[Aromatic Dihydroxy Compound]

The aromatic dihydroxy compound used as one of the raw materials in the above transesterification reaction method is preferably selected from those compounds represented by the following general formula (A-1):

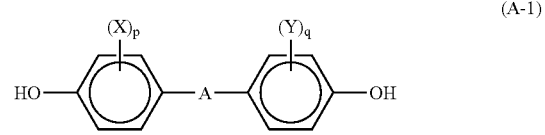

(A-1)

In the above general formula (A-1), "A" represents a single bond, a substituted or unsubstituted and linear, branched or cyclic $C_1$ to $C_{10}$ divalent hydrocarbon group, or a divalent group selected from the group consisting of —O—, —S—, —CO— and —SO$_2$—; X and Y respectively represent a halogen atom or a $C_1$ to $C_6$ hydrocarbon group; and p and q respectively represent an integer of 0 or 1. Meanwhile, X and Y, and p and q may be respectively the same or different from each other.

Examples of the typical aromatic dihydroxy compound may include bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl)sulfide, bis(4-hydroxyphenyl)ether and bis(4-hydroxyphenyl)ketone. These aromatic dihydroxy compounds may be used singly or in the form of a mixture of any two or more thereof. Further, a small amount of a polyvalent alcohol having three or more hydroxy groups in a molecule thereof such as 1,1,1-tris(4-hydroxyphenyl)ethane (THPE) and 1,3,5-tris(4-hydroxyphenyl)benzene, etc., may be used as a branching agent in combination with the above aromatic dihydroxy compound. However, no branching agent is preferably used in the present invention. Of these aromatic dihydroxy compounds, especially preferred is 2,2-bis(4-hydroxyphenyl)propane (hereinafter occasionally referred to merely as "bisphenol A" or abbreviated as "BPA").

These aromatic dihydroxy compounds may contain trace components showing the signals (a), (b) or (c) as measured by $^1$H-NMR. However, the aromatic dihydroxy compounds preferably contain substantially no trace components showing the signals (a), (b) or (c). Here, the "substantially no" means that the amounts of proton (Pa), (Pb) and (Pc) per 1 g of the aromatic dihydroxy compound which are respectively calculated from a sum of integral signal values are preferably less than 1 μmol and more preferably less than 0.1 μmol.

[Carbonic Diester]

The carbonic diester as another raw material is preferably selected from those compounds represented by the following formula (B):

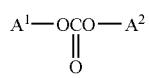

In the formula (B), $A^1$ and $A^2$ independently represent a substituted or unsubstituted and linear, branched or cyclic $C_1$ to $C_{10}$ monovalent hydrocarbon group and may be the same or different from each other.

Typical examples of the carbonic diester may include diphenyl carbonate; substituted diphenyl carbonates such as typically ditolyl carbonate; and dialkyl carbonates such as typically dimethyl carbonate, diethyl carbonate and di-t-butyl carbonate. These carbonic diesters may be used singly or in the form of a mixture of any two or more thereof. Of these carbonic diesters, preferred are diphenyl carbonate (hereinafter occasionally referred to merely as "DPC") and substituted diphenyl carbonates.

In addition, preferably not more than 50 mol % and more preferably not more than 30 mol % of the carbonic diester may be replaced with dicarboxylic acid or dicarboxylic ester. Typical examples of the dicarboxylic acid and dicarboxylic ester may include terephthalic acid, isophthalic acid, diphenyl terephthalate and diphenyl isophthalate. Thus, when a part of the carbonic diester is replaced with the dicarboxylic acid or dicarboxylic ester, polyester carbonates are produced as a reaction product.

These carbonic diesters (including those partially replaced with the above dicarboxylic acid or dicarboxylic ester) are usually used in an excessive amount based on the aromatic dihydroxy compound. More specifically, the carbonic diester is used in such an amount that a molar ratio of the carbonic diester to the aromatic dihydroxy compound lies in the range of 1.001 to 1.3 and preferably 1.01 to 1.2. When the molar ratio is less than 1.001, the polycarbonate as produced tends to be increased in content of end OH groups, resulting in deterioration in thermal stability and hydrolysis resistance. On the other hand, when the molar ratio is more than 1.3, although the polycarbonate as produced is reduced in content of end OH groups, the transesterification reaction rate tends to be lowered under the same conditions, so that it may be difficult to produce polycarbonate having a desired molecular weight. In the present invention, the content of the end OH groups in the polycarbonate is controlled to the range of 50 to 1500 ppm, preferably 100 to 1000 ppm and more preferably 200 to 800 ppm.

As the method of feeding the raw materials to a raw material mixing tank, there is preferably used the method in which one or both of the aromatic dihydroxy compound and the carbonic diester are melted and fed in a liquid state, since liquid can be readily weighed or metered with a higher accuracy. In the case where the raw materials are fed in a liquid state, an oval flow meter, a micromotion-type flow meter, etc., may be used as the weighing or metering device.

On the other hand, in the case where the raw materials are fed in a solid state, weight-measuring devices such as belt type weight feeders and loss-in-weight type weight feeders are preferably used rather than volume-measuring devices such as screw feeders. Of these weight-measuring devices, preferred are loss-in-weight type weight feeders.

[Transesterification Catalyst]

Upon producing the polycarbonate by transesterification method, a catalyst may be usually used therein. The kind of catalyst usable in the process for producing the polycarbonate according to the present invention is not particularly limited. Examples of the generally used catalyst may include basic compounds such as alkali metal compounds, alkali earth metal compounds, basic boron compounds, basic phosphorus compounds, basic ammonium compounds and amine-based compounds. Of these basic compounds, preferred are alkali metal compounds and/or alkali earth metal compounds. These basic compounds may be used singly or in the combination of any two or more thereof.

Specific examples of the alkali metal compounds may include inorganic alkali metal compounds such as hydroxides, carbonates and hydrogencarbonate compounds of lithium, sodium, potassium, rubidium and cesium, and organic alkali metal compounds such as alcoholates, phenolates and organic carboxylates of these metals. Of these alkali metal compounds, preferred are cesium compounds. Examples of the most preferred cesium compounds may include cesium carbonate, cesium hydrogencarbonate and cesium hydroxide.

Also, specific examples of the alkali earth metal compounds may include inorganic alkali earth metal compounds such as hydroxides and carbonates compounds of beryllium, magnesium, calcium, strontium and barium, and organic alkali earth metal compounds such as alcoholates, phenolates and organic carboxylates of these metals.

Of these catalysts, the alkali metal compounds are preferred in order to obtain sufficient $^1$H-NMR signals. Further, in the present invention, the above transesterification catalyst is preferably used in the form of a catalyst solution prepared by dissolving the catalyst in a solvent. Examples of the solvent may include water, acetone, alcohols, toluene and phenol as well as other solvents capable of dissolving the aromatic dihydroxy compound and the carbonic diester as the raw materials. Of these solvents, preferred is water. In particular, the catalyst comprising the alkali metal compounds may be preferably used in the form of an aqueous solution.

The amount of the alkali metal catalyst is $4 \times 10^{-7}$ to $1 \times 10^{-5}$ mol and preferably $1 \times 10^{-6}$ to $6 \times 10^{-6}$ mol based on 1 mol of the aromatic dihydroxy compound. When the amount of the alkali metal catalyst is less than the above-specified range, it may be difficult to attain a sufficient polymerization activity required for producing polycarbonates having a desired molecular weight, and it is, therefore, required to prolong the residence time or increase the reaction temperature upon the polymerization, resulting in poor hue and failing to obtain a satisfactory structure capable of exhibiting the signals (a) and (b) in $^1$H-NMR. On the contrary, when the amount of the alkali metal catalyst is too large, the resultant polycarbonate tends to be deteriorated in hue and hydrolysis resistance as well as mechanical strength and transparency.

[Process for Production of Polycarbonate]

In the present invention, the polycarbonate is preferably produced by transesterification reaction method by using ordinary production facilities used for producing polycarbonates by a melting method without any particular limitation, as long as the proton amounts which are calculated from a sum of integral values of signals detected in the above specific $^1$H-NMR spectra as well as ratios between the integral signal values lie within the specific ranges. However, the above-mentioned proton amounts and ratios may be variously changed depending upon polymerization conditions such as kinds and amounts of the catalyst used, charging ratios of monomers, polymerization temperature, residence time and vacuum degree.

For example, the polymerization reaction (transesterification reaction) for producing the polycarbonate in the present invention is preferably continuously conducted by generally using two or more polymerization vessels, i.e., by two or more stage process, usually 3 to 7 multi-stage process. Specific reaction conditions include a reaction temperature of 150 to 320° C.; a reaction pressure of from ordinary pressure to 2.0 Pa; and an average residence time of 5 to 150 min. In the respective polymerization vessels, in order to allow the reaction to proceed more smoothly and discharge by-produced phenol more effectively, the reaction conditions thereof may be controlled such that the temperature and vacuum degree are sequentially stepwise increased within the above-specified ranges. The $^1$H-NMR signals (a) and (b) detected from the obtained polycarbonate tend to become larger as the amount of the alkali metal catalyst used is increased, and the ratio of (Pa) to (Pb) ((Pa)/(Pb)) and the value of the formula (4) tend to become larger as the residence time is prolonged.

Meanwhile, in the multi-stage process using a plurality of polymerization vessels, an actual amount of the catalyst used therein is preferably automatically controlled in a continuous manner. In this case, it is required that the measurement and automatic control of the amount of the catalyst fed is completed within one third (⅓) of the residence time in the first polymerization vessel.

The thus produced polycarbonate of the present invention generally has a broader molecular weight distribution than that of ordinary polycarbonates. For example, the ratio of a weight-average molecular weight (Mw) to a number-average molecular weight (Mn) (Mw/Mn) of the polycarbonate (calculated as polystyrene) as measured by gel permeation chromatography (GPC) is usually not less than 2.6 and preferably 2.75 to 4.5.

The type of an apparatus used in the above transesterification reaction may be any of vertical type, pipe or tower type and horizontal type. There may be usually used one or more vertical-type polymerization vessels equipped with turbine blades, paddle blades, anchor blades, full zone blades (manufactured by Shinko Pantec Co., Ltd.), Sunmeler blades (manufactured by Mitsubishi Heavy Industries, Ltd.), Maxblend blades (manufactured by Sumitomo Heavy Industries, Ltd.), helical ribbon blades and twisted grid blades (manufactured by Hitachi Ltd.) which are followed by a horizontal single-screw type polymerization vessel of a disk type or a cage type, or a horizontal twin-screw type polymerization vessel equipped with HVR, SCR, N-SCR (manufactured by Mitsubishi Heavy Industries, Ltd.), Bibolak (manufactured by Sumitomo Heavy Industries, Ltd.), spectacle-shaped blades, grid blades (manufactured by Hitachi Ltd.), or the combination of spectacle-shaped blades and blades having a function of feeding polymers, e.g., turned or twisted blades and/or inclined blades.

The polycarbonate produced by the above method usually contains no or not more than 1 ppm of chlorine element, but contains residual components such as raw monomers, catalyst, and low-molecular weight compounds such as aromatic monohydroxy compounds or polycarbonate oligomers by-produced by the transesterification reaction. Among these residual components, the raw monomers and aromatic monohydroxy compounds are present in a large amount, and adversely affect qualities of the polycarbonate such as heat-aging resistance and hydrolysis resistance. Therefore, the raw monomers and aromatic monohydroxy compounds are preferably removed upon production of the polycarbonate. The residual amount of the aromatic monohydroxy compounds in the polycarbonate is not more than 200 ppm by weight and preferably not more than 100 ppm by weight. The residual amount of the aromatic dihydroxy compounds in the polycarbonate is not more than 100 ppm by weight and preferably not more than 50 ppm by weight. The residual amount of the carbonic diester compounds in the polycarbonate is not more than 200 ppm by weight, preferably not more than 150 ppm by weight and more preferably not more than 100 ppm by weight.

The method of removing these residual components is not particularly restricted. For example, these residual components may be continuously removed by volatilization using a vent-type extruder. At this time, the basic transesterification catalyst still remaining in the resin may be deactivated by previously adding thereto acidic compounds or precursors thereof in order to prevent occurrence of undesired side reactions during the volatilization procedure and effectively remove the raw monomers and aromatic hydroxy compounds.

The acidic compounds or precursors thereof added to the catalyst are not particularly restricted, and there may be used any substances capable of effectively neutralizing the basic transesterification catalyst used in the polycondensation reaction. Specific examples of the acidic compounds or precursors thereof may include Brønsted acids such as hydrochloric acid, nitric acid, boric acid, sulfuric acid, sulfurous acid, phosphoric acid, phosphorous acid, phosphorous acid, polyphosphoric acid, adipic acid, ascorbic acid, aspartic acid, azelaic acid, adenosine phosphoric acid, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, as well as esters of these acids. These acidic compounds or precursors thereof may be used singly or in the combination of any two or more thereof. Of these acidic compounds or precursors thereof, preferred are sulfonic acid compounds or esters thereof, for example, p-toluenesulfonic acid, methyl p-toluenesulfonate and butyl p-toluenesulfonate.

The amount of the acidic compounds or precursors thereof added is 0.1 to 50 times by mol and preferably 0.5 to 30 times by mol based on the amount thereof necessary to neutralize the basic transesterification catalyst used in the polycondensation reaction. The acidic compounds or precursors thereof may be added to the reaction system at any time after the polycondensation reaction. Also, the method of adding these acidic compounds or precursors thereof is not particularly restricted, and any methods may be used depending upon properties of these compounds used and desired conditions, for example, there may be used the method of directly adding these compounds to the reaction system, the method of dissolving these compounds in a suitable solvent and then adding the resultant solution to the reaction system, the method using pellets or flake-like master batch of these compounds, etc.

The extruder used for the volatilization may be any of a single-screw type or a twin-screw type. In addition, the twin-screw type extruder may be a geared twin-screw extruder whose screws may be rotated in the same direction or opposite directions. For the purpose of the volatilization, the extruder is preferably provided with a vent portion disposed downstream of the portion where the acidic compounds or precursors thereof are added. The number of vents provided in the extruder is not particularly restricted, and there may be usually used 2 to 10 multi-stage vents. If required, various additives such as stabilizers, ultraviolet absorbers, mold release agents and colorants may be added to the extruder, and mixed and kneaded with the resin therein.

[Polycarbonate Resin Composition]

The polycarbonate resin composition of the present invention may contain at least one kind of additive selected from the group consisting of stabilizers, ultraviolet absorbers, mold release agents, colorants, plasticizers, antistatic agents, fillers, flame retardants, impact modifiers, other resins and epoxy compounds according to the requirements. These additives are not particularly restricted, and there may be used those used for ordinary polycarbonate resin compositions. Further, unless departing from the scope of the present invention, a plurality of polycarbonate resins that are different in molecular weight, production method and branching degree from each other may be used in the form of a mixture thereof.

Examples of the stabilizers may include hindered phenol compounds, phosphorus compounds, sulfur compounds, epoxy compounds, and hindered amine compounds. Of these compounds, preferred is at least one kind of antioxidant selected from the group consisting of hindered phenol compounds and phosphorus compounds.

The hindered phenol compounds are preferably those compounds represented by the following formula (C):

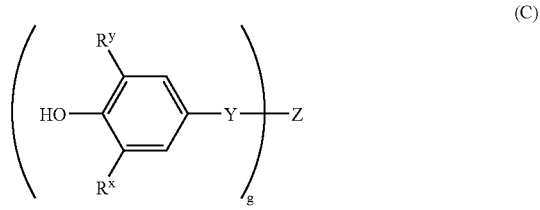

wherein $R^x$ and $R^y$ respectively represent a $C_1$ to $C_{10}$ hydrocarbon group and may be the same or different from each other; Y is a $C_1$ to $C_{20}$ hydrocarbon group that may contain a functional group selected from the group consisting of ester groups, ether groups and amide groups and/or a phosphorus atom; Z is a $C_1$ to $C_6$ hydrocarbon group that may contain an oxygen atom and/or a nitrogen atom, a sulfur atom or a single bond; and g is an integer of 1 to 4.

Specific examples of the hindered phenol compounds may include n-octadecyl-3-(3',5'-di-t-butyl-4'-hydroxyphenyl) propionate, 1,6-hexanediol-bis[3-(3,5-di-t-butyl-4-hydroxyphenyl)propionate], pentaerythrityl-tetrakis[3-(3',5'-di-t-butyl-4'-hydroxyphenyl)propionate], 3,9-bis[1,1-dimethyl-2-{β-(3-t-butyl-4-hydroxy-5-methylphenyl) propionyloxy}ethyl]-2,4,8,10-tetraoxaspiro[5.5]undecane, triethylene glycol-bis[3-(3-t-butyl-5-methyl-4-hydroxyphenyl)propionate]3,5-di-t-butyl-4-hydroxybenzylphosphonate-diethyl ester, 1,3,5-trimethyl-2,4,6-tris(3,5-di-t-butyl-4-hydroxybenzyl)benzene, 2,2-thio-diethylenebis[3-(3,5-di-t-butyl-4-hydroxyphenyl)propionate], tris-(3,5-di-t-butyl-4-hydroxybenzyl)-isocyanurate, and N,N'-hexamethylenebis (3,5-di-t-butyl-4-hydroxy-hydrocinnamamide).

Of these hindered phenol compounds, preferred are n-octadecyl-3-(3',5'-di-t-butyl-4'-hydroxyphenyl)propionate, 1,6-hexanediol-bis[3-(3',5'-di-t-butyl-4-hydroxyphenyl)propionate] and 3,9-bis[1,1-dimethyl-2-{β-(3-t-butyl-4-hydroxy-5-methylphenyl)propionyloxy}ethyl]-2,4,8,10-tetraoxaspiro[5.5]undecane.

The phosphorus compounds are preferably trivalent phosphorus compounds and more preferably at least one compound selected from the group consisting of phosphorous acid esters having at least one ester group which is esterified with phenol and/or phenol having at least one $C_1$ to $C_{25}$ alkyl group, and tetrakis(2,4-di-t-butylphenyl)-4,4'-biphenylenediphosphonite. Specific examples of the phosphorus compounds may include 4,4'-butylidene-bis(3-methyl-6-t-butylphenyl-ditridecyl)phosphite, 1,1,3-tris(2-methyl-4-ditridecyl phosphite-5-t-butylphenyl)butane, trisnonylphenyl phosphite, dinonylphenyl pentaerythritol diphosphite, tris(2,4-di-t-butylphenyl)phosphite, bis(2,4-di-t-butylphenyl)pentaerythritol diphosphite, di(2,6-di-t-butyl-4-methylphenyl)pentaerythritol diphosphite, 2,2'-ethylidene-bis(4,6-di-t-butylphenyl)fluorinated phosphite, 2,2'-methylene-bis(4,6-di-t-butylphenyl)octyl phosphite, bis(2,4-dicumylphenyl)pentaerythritol diphosphite, and phosphorous acid esters containing mononoyl phenol and dinonyl phenol.

In the present invention, of these phosphorus compounds, preferred are tetrakis(2,4-di-t-butylphenyl)-4,4'-biphenylene-diphosphonite, tris(2,4-di-t-butylphenyl)phosphite and 2,2'-methylene-bis(4,6-di-t-butylphenyl)octyl phosphite.

The amount of the stabilizer blended is not more than 1 part by weight, preferably not more than 0.4 part by weight and more preferably in the range of 0.01 to 0.2 part by weight based on 100 parts by weight of the polycarbonate. When the amount of the stabilizer blended is more than 1 part by weight, the resultant composition tends to be deteriorated in hydrolysis resistance, etc. When two or more kinds of stabilizers are used in combination with each other, the mixing ratio between the stabilizers may be optionally determined. Also, the kinds of stabilizers used or the combination thereof may be appropriately determined according to applications of the polycarbonate, etc. For example, the phosphorus compounds generally exhibit a high effect of improving a residence stability under a high temperature condition upon molding the polycarbonate and a heat stability upon use of the resultant molded product, whereas the phenol compounds generally exhibit a high effect of improving a heat stability such as heat-aging resistance upon use of the resultant molded product. Further, when the phosphorus compound is used in combination with the phenol compound, the resultant composition are highly improved in coloring property.

Examples of the ultraviolet absorbers may include inorganic ultraviolet absorbers such as titanium oxide, cerium oxide and zinc oxide as well as organic ultraviolet absorbers such as benzotriazole compounds, benzophenone compounds, triazine compounds, cyanoacrylate compounds and malonic acid-based compounds. In the present invention, of these ultraviolet absorbers, preferred are organic ultraviolet absorbers, and more preferred is at least one compound selected from the group consisting of benzotriazole compounds, 2-(4,6-diphenyl-1,3,5-triazin-2-yl)-5-[(hexyl(oxy)]-phenol and 2-[4,6-bis(2,4-dimethylphenyl)-1,3,5-triazin-2-yl]-5-(octyloxy)phenol as the triazine compounds, [(4-methoxyphenyl)-methylene]propanedioic acid dimethyl ester as the malonic acid-based compound, 2-ethylhexyl-2-cyano-3,3'-diphenyl acrylate as the cyanoacrylate compound, and 2,2'-(1,4-phenylene)bis[4H-3,1-benzoxazin-4-one].

The benzotriazole compounds are preferably condensation products of methyl-3-[3-t-butyl-5-(2H-benzotriazol-2-yl)-4-hydroxyphenyl]propionate-polyethylene glycol, and compounds represented by the following formula (D):

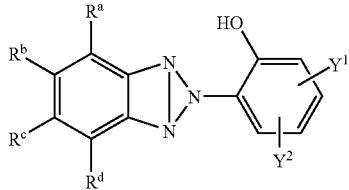

wherein $R^a$ to $R^d$ respectively represent a hydrogen atom, a halogen atom or a $C_1$ to $C_{12}$ hydrocarbon group; $Y^1$ and $Y^2$ respectively represent a hydrogen atom or a $C_1$ to $C_{40}$ hydrocarbon group that may contain a nitrogen atom and/or an oxygen atom.

Specific examples of the benzotriazole compounds represented by the formula (D) may include 2-bis(5-methyl-2-hydroxyphenyl)benzotriazole, 2-(3,5-di-t-butyl-2-hydroxyphenyl)benzotriazole, 2-(3',5'-di-t-butyl-2'-hydroxyphenyl)-5-chlorobenzotriazole, 2-(3-t-butyl-5-methyl-2-hydroxyphenyl)-5-chlorobenzotriazole, 2-(2'-hydroxy-5'-t-octylphenyl)benzotriazole, 2-(3,5-di-t-amyl-2-hydroxyphenyl)benzotriazole, 2-[2-hydroxy-3,5-bis(α,α-dimethylbenzyl)phenyl]-2H-benzotriazole, and condensates of methyl-3-[3-t-butyl-5-(2H-benzotriazol-2-yl)-4-hydroxyphenyl]propionate and polyethylene glycol], as well as the compounds represented by the following formula (E):

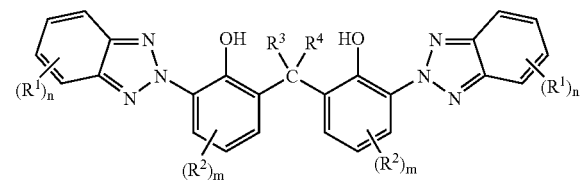

wherein $R^1$ and $R^2$ independently represent a hydrogen atom, a halogen atom, a $C_1$ to $C_{10}$ alkyl group, a $C_5$ to $C_{10}$ cycloalkyl group, a $C_7$ to $C_{13}$ aralkyl group, a $C_6$ to $C_{14}$ aryl group, or a group represented by the following formula (F):

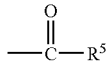

or $-C-O-R^5$ wherein $R^5$ represents hydrogen or a $C_1$ to $C_4$ alkyl group;

$R^3$ and $R^4$ independently represent hydrogen, a $C_1$ to $C_4$ alkyl group, a $C_5$ or $C_6$ cycloalkyl group, benzyl or a $C_6$ to $C_{14}$ aryl group; and m is 1, 2 or 3 and n is 1, 2, 3 or 4.

Of these benzotriazole compounds, preferred are 2-(2'-hydroxy-5'-t-octylphenyl)benzotriazole, 2-[2-hydroxy-3,5-bis(α,α-dimethylbenzyl)phenyl]-2H-benzotriazole, 2,2'-methylenebis-[4-(1,1,3,3-tetramethylbutyl)-6-(2N-benzotriazol-2-yl)phenol], 2-(2H-benzotriazol-2-yl)-4-methyl-6-(3,4,5,6-tetrahydrophthalimidoylmethyl)phenol, 2-(4,6-diphenyl-1,3,5-triazin-2-yl)-5-[(hexyl)oxy]-phenol, and 2-[4,6-bis(2,4-dimethylphenyl)-1,3,5-triazin-2-yl]-5-(octyloxy)phenol.

The amount of the ultraviolet absorber blended is not more than 20 parts by weight based on 100 parts by weight of the polycarbonate. When the amount of the ultraviolet absorber blended is more than 20 parts by weight, there tend to arise problems such as mold deposit upon molding. These ultraviolet absorbers may be used singly or in the combination of any two or more thereof.

The resin composition of the present invention preferably contains at least one kind of mold release agent. In particular, examples of preferred mold release agents used in the present invention may include those selected from the group consisting of aliphatic carboxylic acids, aliphatic alcohols, aliphatic carboxylic acid esters, aliphatic hydrocarbon compounds having a number-average molecular weight of 200 to 15000 and polysiloxane-based silicone oils. Of these mold release agents, preferred is at least one compound selected from the group consisting of aliphatic carboxylic acids and aliphatic carboxylic esters.

Examples of the aliphatic carboxylic acids may include saturated or unsaturated aliphatic monocarboxylic acids, dicarboxylic acids and tricarboxylic acids. Here, the aliphatic carboxylic acids also involve alicyclic carboxylic acids. Of these aliphatic carboxylic acids, preferred are $C_6$ to $C_{36}$ mono- or di-carboxylic acids, and more preferred are $C_6$ to $C_{36}$ aliphatic saturated monocarboxylic acids. Specific examples of such aliphatic carboxylic acids may include palmitic acid, stearic acid, valeric acid, caproic acid, capric acid, lauric acid, arachic acid, behenic acid, lignoceric acid, cerotic acid, melissic acid, tetrariacontanoic acid, montanic acid, glutaric acid, adipic acid and azelaic acid.

As the aliphatic carboxylic acid components constituting the aliphatic carboxylic acid esters, there may be used the same aliphatic carboxylic acids as described above. Also, as the aliphatic alcohol components constituting the aliphatic carboxylic acid esters, there may be used saturated or unsaturated monohydric alcohols, saturated or unsaturated polyhydric alcohols, etc. These alcohols may have substituent groups such as a fluorine atom and an aryl group. Of these alcohols, preferred are saturated monohydric or polyhydric alcohols having not more than 30 carbon atoms, and more preferred are aliphatic saturated monohydric or polyhydric alcohols having not more than 30 carbon atoms. Here, the aliphatic alcohols also involve alicyclic alcohols. Specific examples of the alcohols may include octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylol propane and dipentaerythritol. These aliphatic carboxylic esters may contain aliphatic carboxylic acids and/or alcohols as impurities, or may be in the form of a mixture of a plurality of compounds. Specific examples of the aliphatic carboxylic acid esters may include bees wax (mixtures containing myricyl palmitate as a main component), stearyl stearate, behenyl behenate, octyldodecyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate and pentaerythritol tetrastearate.

In particular, the mold release agent used in the present invention preferably has a molecular weight of not less than 500 and preferably not less than 1000. Of these mold release agents, preferred is pentaerythritol tetrastearate. In particular, when the mold release agent having a molecular weight of not less than 500, the resultant molded products are effectively prevented from suffering from defective appearance on the surface thereof which tends to occur upon extrusion molding conducted at a speed as high as 0.01 m/sec.

In general, the amount of the mold release agent blended is preferably not more than 5 parts by weight, more preferably not more than 1 part by weight and still more preferably in the range of 0.05 to 0.5 part by weight based on 100 parts by weight of the polycarbonate. When the amount of the mold release agent blended is more than 5 parts by weight, the resultant composition tends to be deteriorated in hydrolysis resistance, resulting in clogging of vents due to gases generated upon molding, and the molded product obtained therefrom tends to suffer from defective appearance on the surface thereof. When the amount of the mold release agent blended is less than the lower limit, the effect of adding the mold release agent tends to be sometimes unattainable. These mold release agents may be used singly or in the combination of plural kinds thereof.

As the colorants, there may be used any of organic dyes, organic pigments and inorganic pigments. Examples of the organic dyes and pigments may include compounds having an anthraquinone skeleton and compounds having a phthalocyanine skeleton. Examples of the inorganic pigments may include titanium oxide, carbon black, ultramarine blue and cobalt blue. These inorganic pigments may be surface-coated with silicon compounds, etc. Of these colorants, the compounds having an anthraquinone skeleton are preferred from the standpoints of heat resistance, etc.

Specific examples of the colorants may include phthalocyanine blue; "MACROLEX Blue RR", "MACROLEX Violet 3R" and "MACROLEX Violet B" all produced by Bayer AG.; "Sumiplast Violet RR", "Sumiplast Violet B" and "Sumiplast Blue OR" all produced by Sumitomo Chemical Co., Ltd.; and "Diaresin Violet D", "Diaresin Blue G" and "Diaresin Blue N" all produced by Mitsubishi Chemical Corporation.

The amount of the colorant blended is preferably not more than 5 parts by weight, more preferably not more than 0.5 part by weight and still more preferably in the range of 0.00001 to 0.05 part by weight based on 100 parts by weight of the polycarbonate. These colorants may be used singly or in the combination of plural kinds thereof.

The timing and method of addition of the additives such as stabilizers, ultraviolet absorbers, mold release agents and colorants are not particularly restricted. For example, these additives may be added (1) during the polymerization reaction, (2) upon completion of the polymerization reaction, or (3) after deactivating the catalyst used in the polymerization with a catalyst deactivator but before pelletizing the resin, and further in the course of mixing and kneading of the polycarbonate, etc., during which the polycarbonate is kept in a molten state. Alternatively, after blending the additives with solid polycarbonate in the form of pellets or particles, the mixture may be mixed and kneaded together using an extruder, etc. However, from the standpoints of preventing decomposition of these additives and discoloration of the obtained resin composition, the additives are preferably added either (1) during the polymerization reaction, (2) upon completion of the polymerization reaction, or (3) after deactivating the catalyst used in the polymerization with a catalyst deactivator but before pelletizing the resin.

As the method for adding the additives, there may be used the method of directly mixing or kneading the additives such as stabilizers, ultraviolet absorbers, mold release agents and colorants with the polycarbonate, or the method of adding a high-concentration master batch prepared by dissolving the additives in a suitable solvent and blending the obtained solution with a small amount of the polycarbonate or other resins, etc. Further, when two or more additive compounds are used in combination with each other, these additives may be added either separately or at the same time.

In the present invention, the above polycarbonate resin composition may further contain various other additives such as other kinds of thermoplastic resins, flame retardants, impact modifiers, antistatic agents, slip agents, antiblocking agents, lubricants, antifogging agents, natural oils, synthetic oils, waxes, dispersing agents, organic fillers and inorganic fillers to impart desired properties thereto, unless the addition thereof adversely affects the objects of the present invention.

In particular, the resin composition of the present invention can exhibit a more excellent performance when applied to production of profile extrusion-molded products such as pipes, twin-wall molded products and multi-wall molded products by an extrusion molding method using a sizing die. In the extrusion molding method using a sizing die, the molten resin composition is first extruded through the sizing die to conduct sizing thereof, and then cooled. Here, the "sizing" means that the molten resin extruded is formed into desired shape and dimension, and preliminarily cooled to prevent deformation thereof until the subsequent cooling step. Also, the "sizing die" means such a die having a function capable of forming the extruded molten resin composition into desired shape and dimension.

[Extrusion-molded Product]

The molded product of the present invention is produced by extrusion-molding the resin composition of the present invention using the sizing die. Among them, preferred molded products are twin-wall molded products or multi-wall molded products having three or more-layered walls. Although the extrusion-molding conditions used for producing the molded product of the present invention are not particularly restricted, an example thereof is described below.

Pellets of the polycarbonate-based resin composition of the present invention are fed into a single- or twin-screw extruder whose cylinder is set to a temperature of 240 to 290° C., and melted and kneaded therein under screw shearing. The thus obtained molten resin is extruded into a predetermined shape through a die head, and then passed along a sizing die having a predetermined shape whose temperature set to 20 to 110° C. to cool the extruded resin, thereby obtaining a molded product having a stable shape. In the present invention, the extrusion-molding speed is preferably not less than 0.01 m/sec and more preferably not less than 0.02 m/sec.

Further, the polycarbonate-based resin composition for extrusion molding using a sizing die according to the present invention may also be preferably applied to production of molded products whose surface is at least partially covered with a coating layer. Also, the resin composition of the present invention may also be applied to production of laminates obtained by integrally laminating other resin compositions or other materials on a layer of the resin composition by a co-extrusion or lamination method. In particular, the resin composition of the present invention is more preferably applied to production of molded products whose surface is at least partially covered with a coating layer which is integrally laminated thereon by a co-extrusion method.

Among these molded products, preferred are those in which the other resin composition is a polycarbonate resin composition comprising as a main component, a polycarbonate containing main repeating units represented by the above formula (A) and having a viscosity-average molecular weight of 17000 to 40000, wherein an amount of proton (Pa) and an amount of proton (Pb) per 1 g of the polycarbonate which are calculated from respective integral values of a signal (a) detected at $\delta$=7.96 to 8.02 ppm and a signal (b) detected at $\delta$=8.11 to 8.17 ppm in $^1$H-NMR spectra thereof as measured in a deuterated chloroform solvent, satisfy the following formula (x):

$$\{(Pa)+(Pb)\}<26 \qquad (x)$$

wherein a unit of each of (Pa) and (Pb) is µmol/g.

Further, the other resin composition more preferably contains at least one kind of ultraviolet absorber in an amount of 1 to 25 parts by weight. Examples of the ultraviolet absorbers may include the same ultraviolet absorbers as described previously. Of these ultraviolet absorbers, as described above, preferred is at least one compound selected from the group consisting of triazole-based compounds, triazine-based compounds, cyanoacrylate-based compounds and benzophenone-based compounds, and more preferred are benzotriazole-based compounds. These ultraviolet absorbers may be used singly or in the combination of plural kinds thereof. The amount of the ultraviolet absorbers blended is usually in the range of 1 to 25 parts by weight, preferably 2 to 20 parts by weight based on 100 parts by weight of the polycarbonate. When the amount of the ultraviolet absorbers blended is more than 25 parts by weight, there tend to occur problems such as generation of gases and mold deposit upon molding. When the amount of the ultraviolet absorbers blended is less than 1 part by weight, a sufficient effect of adding the ultraviolet absorbers tends to be unattainable.

In the molded products having a coating layer, the polycarbonate resin composition of the present invention preferably contains no ultraviolet absorbers, or contains the ultraviolet absorbers in an amount as low as not more than 1 part by weight.

Examples of the other resin composition usable together with the polycarbonate resin composition of the present invention may include polymethylmethacrylate resins in addition to those described above.

In the present invention, the coating layer may be provided on not only one surface portion but also plural surface portions of the extrusion-molded product (base body) obtained using a sizing die. The thickness of the coating layer is preferably in the range of 10 to 200 µm. When the coating layer comprises polycarbonate resin compositions, the viscosity-average molecular weight of the polycarbonate used in the coating layer is controlled to the range of −4000 to +8000 relative to that of the polycarbonate used in the base body of the molded product. When the value of $\{(Pa)+(Pb)\}$ of the polycarbonate used in the coating layer is out of the range as represented by the formula (1), the resultant molded product tends to suffer from defective appearance such as fish eyes. When the thickness of the coating layer is less than 10 µm, it may be difficult to cover the molded product with a coating layer having a uniform thickness, thereby failing to attain the effect of improving a weather resistance thereof. When the thickness of the coating layer is more than 200 µm, the hue of the resultant molded product tends to be more remarkably adversely affected by the ultraviolet absorbers contained therein. The polycarbonate resin composition used in the coating layer may also contain, in addition to the above ultraviolet absorbers, various additives such as heat stabilizers, mold release agents and colorants as described above, as well as antistatic agents, conductive agents, heat ray-shielding agents and antireflective agents according to requirements. The coating layer may be constituted from a single layer or multiple layers. For example, if the coating layer comprises the polycarbonate-based resin composition, additional layers comprising polyethylene terephthalate, polyamide, etc., may be formed by a multi-layer extrusion molding (composite extrusion molding) in order to improve a gas-barrier property of the polycarbonate. In addition, according to aimed applications, the surface of the molded product may be treated or printed with acryl-based or silicone-based hard coating agents, antistatic agents, heat ray-shielding agents, antireflective agents, conductive agents, etc.

The size of the molded product of the present invention is not particularly restricted. For example, in the case of profile extrusion-molded products, the thickness thereof is preferably in the range of 0.1 to 7 mm, more preferably 0.2 to 5 mm and most preferably 0.3 to 3 mm from the standpoints of strength and shape retention thereof. In the case of plate-like twin-wall or multi-wall molded products, the thickness thereof as products is usually in the range of about 2 to 50 mm.

PREFERRED EMBODIMENT OF THE INVENTION

The present invention is described in more detail below by the following examples. However, these examples are only illustrative and not intended to limit the scope of the present invention. Meanwhile, the analytic results and properties were evaluated and measured by the following methods in which the hue (YI) (6) and the Izod impact strength (7) were expressed by values measured and evaluated using ordinary test specimens prepared.

(1) $^1$H-NMR Measurement

Polycarbonate was dissolved in chloroform, and the resultant solution was dropped into a mixed solvent containing n-hexane and methanol at a mixing ratio of 4:1 to reprecipitate resin components therefrom. The thus precipitated resin components were filtered and dried to prepare polycarbonate from which additive components were removed. The thus obtained polycarbonate was used for preparation of a sample. Specifically, about 0.18 g of the thus treated polycarbonate and about 3 mg of triphenyl methane (TPM) as an internal standard were dissolved in 1 g of deuterated chloroform containing 0.05% by weight of tetramethyl silane (TMS) to prepare the sample. The thus prepared sample was subjected to $^1$H-NMR measurement at a temperature of 50° C. at a cumulative frequency of 8000 times using "JMN-AL400" manufactured by JEOL. Ltd. After the measurement, the integral intensity of signals detected at $\delta$=7.96 to 8.02 ppm, $\delta$=8.11 to 8.17 ppm and $\delta$=10.35 to 10.5 ppm in $^1$H-NMR spectra was measured. From the thus measured value and the integral intensity of a signal of TPM observed in a range of 5.5 to 5.6 ppm, the amount of proton per 1 g of the polycarbonate was calculated according to the following formula:

$$\text{Proton amount } (\mu \text{ mol/g}) = \{(\text{signal integral intensity})/(TPM \text{ signal integral intensity})\} \times (TPM \text{ weight})/244.3/(\text{polycarbonate weight}) \times 10^{-6}$$

(2) Viscosity-average Molecular Weight (Mv)

Using an Ubbelohde viscometer, an intrinsic viscosity [η] of the polycarbonate was measured in methylene chloride at 20° C., and the viscosity-average molecular weight (Mv) thereof was calculated according to the following formula:

$$[\eta]=1.23\times10^{-4}\times(Mv)^{0.83}$$

(3) Content of End OH Groups

Colorimetric determination was conducted by titanium tetrachloride/acetic acid method (the method described in "Makromol. Chem.", 88, 215(1965)). The measured value was represented by a weight (unit: ppm) of end OH groups based on a weight of the polycarbonate.

(4) Quantitative Determination of Residual Monomers

Using a column "μ-Bondersphere" manufactured by Waters, Inc., and an aqueous solution of acetonitrile and acetic acid as a solvent, the amounts of phenol as an aromatic monohydroxy compound, bisphenol A (BPA) as an aromatic dihydroxy compound and diphenyl carbonate (DPC) as a diphenyl carbonate compound were measured by a high-speed liquid chromatograph equipped with a UV detector, and expressed by a weight (unit: ppm) of the residual monomers based on a weight of the polycarbonate.

(5) Measurement of Molecular Weight Distribution (Mw/Mn)

Measurement of molecular weight distribution was conducted using an analyzer "HLC-8020" manufactured by Tosoh Corporation, connected to four columns each having a diameter of 7.8 mmφ and a length of 300 mm which were filled with TSK 5000HLX, 4000HLX, 3000HLX and 2000HLX all produced by Tosoh Corporation, respectively. As an eluent, there was used tetrahydrofuran. The calibration curve was prepared using standard polystyrenes produced by Chemco Scientific Co., Ltd. (having a molecular weight: 761 (Mw/Mn≦1.14); 2000 (Mw/Mn≦1.20); 4000 (Mw/Mn≦1.06); 9000 (Mw/Mn≦1.04); 175000 (Mw/Mn≦1.03); 50000 (Mw/Mn≦1.03); 233000 (Mw/Mn≦1.05); 600000 (Mw/Mn≦1.05); and 900000 (Mw/Mn≦1.05), respectively).

In the measurement, using a chart detected from refractive index of a sample, Mw/Mn of the polycarbonate was obtained from that calculated as the polystyrene.

(6) Hue (YI)

Sample pellets of polycarbonate were dried at 120° C. for 5 hours, and molded into a 3 mm-thick test specimen using an injection molding machine "M150AII-SJ" manufactured by Meiki Co., Ltd., whose cylinder temperature was set to 280° C. The YI value of the thus prepared test specimen was measured using a spectroscopic colorimeter "SE2000" manufactured by Nippon Denshoku Industries Co., Ltd. The larger the YI value, the more considerably the polycarbonate was discolored.

(7) Izod Impact Strength

Sample pellets of polycarbonate were dried at 120° C. for 5 hours, and molded into a 3.2 mm-thick test specimen using an injection molding machine "M150AII-SJ" manufactured by Meiki-Co., Ltd., whose cylinder temperature was set to 280° C. The notched Izod impact strength of the thus prepared test specimen was measured according to ASTM D256.

(8) Test for Determining Pipe Moldability

The polycarbonate resin composition was subjected to profile extrusion molding to form a cylindrical molded product using a 50 mmφ single-screw extruder whose barrel temperature and screw rotating speed were controlled to 255 to 270° C. and 41 rpm, respectively, which was provided with a die head having an outer diameter of 4.1 mm and an inner diameter of 3.8 mm. In the profile extrusion molding procedure, the pipe take-off speed was variously changed to examine a suitable take-off speed range capable of stably forming the pipe.

The wider the take-off speed range, the more readily the pipe was formed.

(9) Twin-wall Sheet Moldability

A twin-wall molded product having a whole product thickness of 6 mm, an outer layer thickness of 0.4 to 0.6 mm and a product weight of 1200 to 1300 g/m$^2$ was produced using a single-screw extruder whose barrel temperature and sizing die temperature were controlled to 250 to 265° C. and 20 to 90° C., respectively. The thus produced molded product was bent by hand to examine whether or not any cracks were caused therein.

EXAMPLE 1

A molten solution prepared by mixing diphenyl carbonate and bisphenol A with each other under a nitrogen atmosphere was continuously fed to a first vertical agitation polymerization vessel which was controlled to a temperature of 220° C. and a pressure of 1.33×10$^4$ Pa, and a liquid level therein was kept constant while controlling an opening degree of a valve provided on a polymer discharge line connected to a bottom of the polymerization vessel such that an average residence time in the polymerization vessel was 60 min. In addition, simultaneously with initiation of feeding the above mixture, an aqueous cesium carbonate solution as a catalyst was continuously fed to the polymerization vessel in a feed amount of 1.2×10$^{-6}$ mol per 1 mol of bisphenol A.

The polymerization reaction solution discharged from the bottom of the first polymerization vessel was successively fed to second and third vertical agitation polymerization vessels and a fourth horizontal polymerization vessel, and then withdrawn from a polymer discharge port provided at a bottom of the fourth polymerization vessel. The respective reaction vessels were controlled to higher temperature, higher vacuum and lower agitation speed with progress of the reaction in which the fourth vessel was controlled to a temperature of 290° C., a pressure of 66 to 330 Pa and an average residence time of 60 to 120 min, and simultaneously by-produced phenol was distilled off. After completion of the polymerization, the polycarbonate kept in a molten state was fed into a twin-screw extruder (46 mmφ twin-screw extruder manufactured by Kobe Seisakusho Co., Ltd.), continuously kneaded with butyl p-toluenesulfonate in an amount of 4 mol per 1 mol of cesium carbonate used as the catalyst, volatilized, and then extruded into strands through a die. The thus extruded strands were cut by a cutter to form pellets. The thus obtained polycarbonate resin pellets were directly used to prepared the test specimen and form molded products such as pipes and twin-wall molded products.

The analytic results as well as the results of evaluation of extrusion molding are shown in Table 1.

EXAMPLES 2 TO 4 AND COMPARATIVE EXAMPLES 1 AND 2

The same procedure as defined in Example 1 was conducted except that the amount of catalyst used was changed to those shown in Table 1 or 2, thereby conducting the polymerization, producing an aromatic polycarbonate and subjecting the respective resins to extrusion molding. The results are shown in Tables 1 and 2.

TABLE 1

|  | Example 1 | Example 2 | Example 3 |
|---|---|---|---|
| Amount of catalyst ($\times 10^{-7}$ mol per mol of BPA) | 12 | 8 | 6 |
| End hydroxyl group (ppm) | 520 | 320 | 66 |
| Mw/Mn | 3.4 | 2.9 | 3.1 |
| Residual phenol (ppm) | 27 | 28 | 16 |
| Residual BPA (ppm) | 9 | 6 | 5 |
| Residual DPC (ppm) | 177 | 196 | 298 |
| Viscosity-average molecular weight | 21000 | 22000 | 22500 |
| Pa (µmol/g) | 15.00 | 4.00 | 9.55 |
| Pb (µmol/g) | 6.14 | 4.90 | 6.94 |
| Pc (µmol/g) | 0.87 | 0.89 | 0.25 |
| (Pa) + (Pb) | 21.14 | 8.90 | 16.49 |
| (Pc)/(Pa) | 0.058 | 0.120 | 0.026 |
| (Pa)/(Pb) | 2.443 | 0.816 | 1.376 |
| (Pb)/{(Pb) + (Pc)} | 0.875 | 0.911 | 0.965 |
| Hue (YI) | 1.9 | 1.6 | 3.3 |
| Izod impact strength (J/m) | 720 | 750 | 710 |
| Pipe moldability test |  |  |  |
| Moldable take-off speed range (m/min) | 1.7-2.3 | 1.8-1.9 | 1.8-2.1 |
| Twin-wall sheet bending test | Non-cracked | Non-cracked | Non-cracked |

TABLE 2

|  | Example 4 | Comparative Example 1 | Comparative Example 2 |
|---|---|---|---|
| Amount of catalyst ($\times 10^{-7}$ mol per mol of BPA) | 6 | 4 | 18 |
| End hydroxyl group (ppm) | 626 | 1070 | 480 |
| Mw/Mn | 3.2 | 2.5 | 3.7 |
| Residual phenol (ppm) | 21 | 30 | 30 |
| Residual BPA (ppm) | 12 | 15 | 10 |
| Residual DPC (ppm) | 155 | 102 | 205 |
| Viscosity-average molecular weight | 25800 | 21000 | 21000 |
| Pa (µmol/g) | 9.31 | 1.11 | 19.20 |
| Pb (µmol/g) | 7.02 | 2.39 | 7.23 |
| Pc (µmol/g) | 1.06 | 1.17 | 0.83 |
| (Pa) + (Pb) | 16.33 | 3.60 | 26.30 |
| (Pc)/(Pa) | 0.114 | 1.054 | 0.043 |
| (Pa)/(Pb) | 1.326 | 0.460 | 2.656 |
| (Pb)/{(Pb) + (Pc)} | 0.869 | 0.671 | 0.897 |
| Hue (YI) | 2.3 | 1.3 | 2.6 |
| Izod impact strength (J/m) | 760 | 720 | 230 |
| Pipe moldability test |  |  |  |
| Moldable take-off speed range (m/min) | 1.8-2.0 | Unmoldable | 1.7-2.3 |
| Twin-wall sheet bending test | Non-cracked | Unmoldable | Cracked |

EXAMPLES 5 TO 10

After conducting the polymerization procedure by the same method as defined in Examples 1 to 4 and Comparative Examples 1 and 2, the resultant resins were kneaded with butyl p-toluenesulfonate as well as various additives shown in Tables 3 and 4 which were added to the twin-screw extruder at a position located downstream of a port for adding the butyl p-toluenesulfonate, thereby obtaining pellets. The thus obtained pellets were molded into a twin-wall molded product. In Examples 8 to 10, as the polycarbonate resin composition for forming a coating layer, there were used blended mixtures as shown in Tables 3 and 4 which were extruded from a 30 mmφ twin-screw extruder to form pellets thereof. Using the thus obtained pellets as a coating material for forming the coating layer, a twin-wall molded product having a 30 µm-thick coating layer on one surface thereof was produced by co-extrusion molding method. Specifically, the coating layer was co-extruded at a barrel temperature of 250 to 270° C. while controlling the amount of the coating material discharged by varying a screw rotating speed of the extruder, thereby adjusting the thickness of the resultant coating layer to 30 µm. The results are shown in Tables 3 and 4.

TABLE 3

|  |  | Example 5 | Example 6 | Example 7 |
|---|---|---|---|---|
| Base body |  |  |  |  |
| Resin used | PC | Example 3 | Example 3 | Example 3 |
| Stabilizer (wt part) | AO-1 | 0.02 | 0.02 | 0.02 |
|  | AO-2 | — | — | — |
| Mold release agent (wt part) | PTS | 0.3 | — | — |
|  | Monogly | — | 0.1 | — |
| Ultraviolet absorber (wt part) | UVA-1 | 0.3 | — | — |
|  | UVA-2 | — | 0.3 | — |
|  | UVA-3 | — | — | — |
|  | UVA-4 | — | — | — |
| Coating layer |  |  |  |  |
| Resin used | PC | — | — | — |
| Stabilizer (wt part) | AO-1 | — | — | — |
| Mold release agent (wt part) | PTS | — | — | — |
|  | Monogly | — | — | — |
| Ultraviolet absorber (wt part) | UVA-1 | — | — | — |
|  | UVA-2 | — | — | — |
|  | UVA-3 | — | — | — |
|  | UVA-4 | — | — | — |
| Mv difference |  | — | — | — |
| Appearance | Extruding speed |  |  |  |
|  | 0.030 m/sec | Good | Good | Poor |
|  | 0.040 m/sec | Good | Poor | Poor |

TABLE 4

|  |  | Example 8 | Example 9 | Example 10 |
|---|---|---|---|---|
| Base body |  |  |  |  |
| Resin used | PC | Example 3 | Example 3 | Example 3 |
| Stabilizer (wt part) | AO-1 | 0.02 | 0.02 | 0.02 |
|  | AO-2 | 0.1 | — | — |
| Mold release agent (wt part) | PTS | 0.3 | 0.3 | 0.3 |
|  | Monogly | — | — | — |

TABLE 4-continued

|  |  | Example 8 | Example 9 | Example 10 |
|---|---|---|---|---|
| Ultraviolet absorber (wt part) | UVA-1 | — | — | — |
|  | UVA-2 | — | — | — |
|  | UVA-3 | — | — | — |
|  | UVA-4 | 0.2 | — | 0.15 |
| Coating layer |  |  |  |  |
| Resin used | PC | PC-1 | Example 2 | Com. Ex. 2 |
| Stabilizer (wt part) | AO-1 | 0.02 | 0.02 | 0.02 |
| Mold release agent (wt part) | PTS | 0.3 | 0.3 | 0.3 |
|  | Monogly | — | — | — |
| Ultraviolet absorber (wt part) | UVA-1 | — | — | 7 |
|  | UVA-2 | 7 | — | — |
|  | UVA-3 | — | 5 | — |
|  | UVA-4 | — | — | — |
| Mv difference |  | +5500 | −500 | −1500 |
| Appearance | Extruding speed |  |  |  |
|  | 0.030 m/sec | — | — | — |
|  | 0.040 m/sec | Good | Good | Poor |

In Tables 3 and 4, the abbreviations used therein are as follows.

AO-1: tris(2,4-di-t-butylphenyl)phosphite

AO-2: tetrakis[methylene-3-(3,5-di-t-butyl-4-hydroxyphenyl)propionate]methane

PTS: pentaerythritol tetrastearate

Monogly: stearic acid monoglyceride

UVA-1: 2-[2-hydroxy-3,5-bis(α,α-dimethylbenzyl)phenyl]-2H-benzotriazole

UVA-2: 2,2'-methylenebis-[4-(1,1,3,3-tetramethylbutyl)-6-(2N-benzotriazol-2-yl)phenol]

UVA-3: 2-(4,6-diphenyl-1,3,5-triazin-2-yl)-5-[(hexyl)oxy]-phenol

UVA-4: 2-(2'-hydroxy-5'-t-octylphenyl)benzotriazole

PC: polycarbonate

PC-1: tradename "IUPILON (registered trademark) E-2000F" produced by Mitsubishi Engineering-Plastics Corporation (Pa), (Pb) and (Pc): respectively 0 μmol/g)

INDUSTRIAL APPLICABILITY

According to the present invention, there can be provided a polycarbonate-based resin composition that is excellent in mechanical properties inherent to polycarbonates, transparency, moldability and hue, and is suitably used in extrusion molding using a sizing die for producing profile extrusion-molded products such as pipes and twin-wall molded products; as well as a molded product obtained by extrusion-molding the polycarbonate-based resin composition using a sizing die.

What is claimed is:

1. A polycarbonate-based resin composition for extrusion molding using a sizing die, the polycarbonate-based resin composition comprising as a main component, a polycarbonate having a viscosity-average molecular weight of 17000 to 27000 and containing main repeating units represented by the following formula (A):

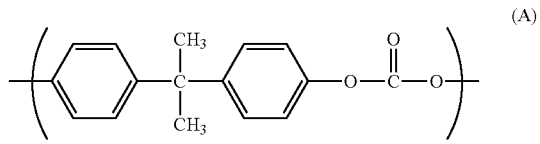

wherein an amount of proton (Pa) and an amount of proton (Pb) per 1 g of the polycarbonate which are calculated from respective integral values of a signal (a) detected at δ=7.96 to 8.02 ppm and a signal (b) detected at δ=8.11 to 8.17 ppm in $^1$H-NMR spectra thereof as measured in a deuterated chloroform solvent, satisfy the following formula (1):

$$4 < \{(Pa)+(Pb)\} < 26 \quad (1)$$

wherein a unit of each of (Pa) and (Pb) is μmol/g.

2. A polycarbonate-based resin composition according to claim 1, wherein a ratio of an amount of proton (Pc) per 1 g of the polycarbonate which is calculated from an integral value of a signal (c) detected at S=10.35 to 10.50 ppm in $^1$H-NMR spectra thereof as measured in a deuterated chloroform solvent, to the amount of proton (Pa) ((Pc/(Pa)), and a ratio of the amount of proton (Pa) to the amount of proton (Pb) ((Pa)/(Pb)), satisfy the following formulae (2) and (3), respectively:

$$0 < (Pc)/(Pa) < 0.5 \quad (2); \text{ and}$$

$$0.5 < (Pa)/(Pb) < 3 \quad (3)$$

wherein a unit of each of (Pa), (Pb) and (Pc) is μmol/g.

3. A polycarbonate-based resin composition according to claim 1 or 2, wherein the amount of proton (Pb) and the amount of proton (Pc) have a relationship represented by the following formula (4):

$$0.70 < (Pb)/\{(Pb)+(Pc)\} < 0.96 \quad (4)$$

wherein a unit of each of (Pb) and (Pc) is μmol/g.

4. A polycarbonate-based resin composition according to any one of claims 1 to 3, wherein the polycarbonate is produced by transesterification of an aromatic dihydroxy compound and a carbonic diester compound.

5. A polycarbonate-based resin composition according to any one of claims 1 to 4, further comprising at least one mold release agent in an amount of 0.001 to 5 parts by weight.

6. A polycarbonate-based resin composition according to claim 5, wherein the mold release agent is at least one compound selected from the group consisting of hydrocarbons, aliphatic carboxylic acids, aliphatic alcohols, esters of aliphatic carboxylic acids and alcohols, and polysiloxane-based silicone oils.

7. A molded product produced by extrusion-molding the resin composition as defined in any one of claims 1 to 6 using a sizing die.

8. A molded product according to claim 7, wherein the molded product is in the form of a twin-wall molded product or a molded product having three or more-layered walls.

9. A molded product according to claim 7 or 8, wherein the molded product is provided on at least a part of a surface thereof with a coating layer.

10. A molded product according to any one of claims 7 to 9, wherein the molded product is in the form of a laminate produced by integrally laminating a layer comprising other resin composition thereon by a co-extrusion method.

11. A molded product according to any one of claims 7 to 10, wherein the molded product is provided on at least a part of a surface thereof with a coating layer comprising the other resin composition, and the coating layer is integrally laminated thereon by a co-extrusion method.

12. A molded product according to claim 10 or 11, wherein the other resin composition is a polycarbonate resin composition comprising as a main component, a polycarbonate having a viscosity-average molecular weight of 17000 to 40000 and containing main repeating units represented by the following formula (A):

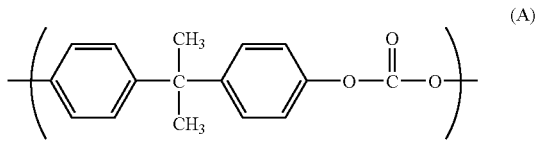

wherein an amount of proton (Pa) and an amount of proton (Pb) per 1 g of the polycarbonate which are calculated from respective integral values of a signal (a) detected at δ=7.96 to 8.02 ppm and a signal (b) detected at δ=8.11 to 8.17 ppm in $^1$H-NMR spectra thereof as measured in a deuterated chloroform solvent satisfy the following formula (x):

$$\{(Pa)+(Pb)\}<26 \qquad (x)$$

wherein a unit of each of (Pa) and (Pb) is μmol/g.

13. A molded product according to claim 10 or 11, wherein the other resin composition contains at least one ultraviolet absorber in an amount of 1 to 25 parts by weight.

14. A molded product according to claim 13, wherein the ultraviolet absorber is at least one compound selected from the group consisting of triazole-based compounds, triazine-based compounds, cyanoacrylate-based compounds and benzophenone-based compounds.

15. A polycarbonate-based resin composition according to claim 2, wherein the amount of proton (Pb) and the amount of proton (Pc) have a relationship represented by the following formula (4):

$$0.70<(Pb)/\{(Pb)+(Pc)\}<0.96 \qquad (4)$$

wherein a unit of each of (Pb) and (Pc) is μmol/g.

16. A polycarbonate-based resin composition according to claim 2, wherein the polycarbonate is produced by transesterification of an aromatic dihydroxy compound and a carbonic diester compound.

17. A polycarbonate-based resin composition according to claim 3, wherein the polycarbonate is produced by transesterification of an aromatic dihydroxy compound and a carbonic diester compound.

18. A polycarbonate-based resin composition according to claim 2, further comprising at least one mold release agent in an amount of 0.001 to 5 parts by weight.

19. A polycarbonate-based resin composition according to claim 3, further comprising at least one mold release agent in an amount of 0.001 to 5 parts by weight.

20. A polycarbonate-based resin composition according to claim 4, further comprising at least one mold release agent in an amount of 0.001 to 5 parts by weight.

21. A molded product according to claim 8, wherein the molded product is provided on at least a part of a surface thereof with a coating layer.

22. A molded product according to claim 8, wherein the molded product is in the form of a laminate produced by integrally laminating a layer comprising another resin composition thereon by a co-extrusion method.

23. A molded product according to claim 9, wherein the molded product is in the form of a laminate produced by integrally laminating a layer comprising another resin composition thereon by a co-extrusion method.

24. A molded product according to claim 8, wherein the molded product is provided on at least a part of a surface thereof with a coating layer comprising another resin composition, and the coating layer is integrally laminated thereon by a co-extrusion method.

25. A molded product according to claim 9, wherein the molded product Is provided on at least a part of a surface thereof with a coating layer comprising another resin composition, and the coating layer is integrally laminated thereon by a co-extrusion method.

26. A molded product according to claim 10, wherein the molded product is provided on at least a part of a surface thereof with a coating layer comprising another resin composition, and the coating layer is integrally laminated thereon by a co-extrusion method.

27. A molded product according to claim 11, wherein said another resin composition is a polycarbonate resin composition comprising as a main component, a polycarbonate having a viscosity-average molecular weight of 17000 to 40000 and containing main repeating units represented by the following formula (A):

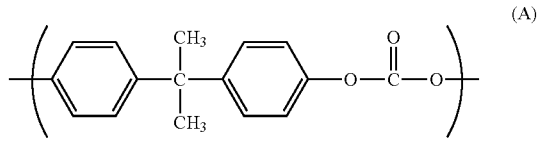

wherein an amount of proton (Pa) and an amount of proton (Pb) per 1 g of the polycarbonate which are calculated from respective integral values of a signal (a) detected at δ=7.96 to 8.02 ppm and a signal (b) detected at δ=8.11 to 8.17 ppm in $^1$H-NMR spectra thereof as measured in a deuterated chloroform solvent, satisfy the following formula (x):

$$\{(Pa)+(Pb)\}<26 \qquad (x)$$

wherein a unit of each of (Pa) and (Pb) is μmol/g.

28. A molded product according to claim 11, wherein said another resin composition contains at least one ultraviolet absorber in an amount of 1 to 25 parts by weight.

* * * * *